United States Patent
Mizushima et al.

(10) Patent No.: US 9,802,603 B2
(45) Date of Patent: Oct. 31, 2017

(54) HYBRID VEHICLE CONTROL DEVICE AND CONTROL METHOD

(71) Applicant: Nissan Motor Co., Ltd., Kanagawa (JP)

(72) Inventors: Toshiya Mizushima, Kanagawa (JP); Ryosuke Ito, Kanagawa (JP)

(73) Assignee: NISSAN MOTOR CO., LTD., Kanagawa (JP)

( * ) Notice: Subject to any disclaimer, the term of this patent is extended or adjusted under 35 U.S.C. 154(b) by 0 days.

(21) Appl. No.: 15/023,624

(22) PCT Filed: Sep. 20, 2013

(86) PCT No.: PCT/JP2013/075422
§ 371 (c)(1),
(2) Date: Mar. 21, 2016

(87) PCT Pub. No.: WO2015/040729
PCT Pub. Date: Mar. 26, 2015

(65) Prior Publication Data
US 2016/0207520 A1 Jul. 21, 2016

(51) Int. Cl.
*B60W 20/00* (2016.01)
*B60W 20/10* (2016.01)
(Continued)

(52) U.S. Cl.
CPC .............. *B60W 20/10* (2013.01); *B60K 6/48* (2013.01); *B60K 6/543* (2013.01); *B60W 10/02* (2013.01);
(Continued)

(58) Field of Classification Search
None
See application file for complete search history.

(56) References Cited

U.S. PATENT DOCUMENTS 7,091,839 B2　8/2006　Situ et al.
2013/0090798 A1　4/2013　Fukushiro

FOREIGN PATENT DOCUMENTS

JP　2005-255158 A　9/2005
JP　2010-143307 A　7/2010
WO　2011/158318 A1　12/2011

OTHER PUBLICATIONS

International Preliminary Report on Patentability issued in PCT Application No. PCT/JP2013/075422, dated Mar. 22, 2016 (9 pages).

*Primary Examiner* — Rami Khatib
*Assistant Examiner* — Gerrad A Foster
(74) *Attorney, Agent, or Firm* — Osha Liang LLP

(57) ABSTRACT

A control apparatus of a hybrid vehicle that uses a combination of an engine and a traveling motor as vehicle drive sources has an engine speed detector configured to detect an engine rotational speed, an EV-state determination unit configured to determine whether a mode is an EV state in which the traveling motor is mainly used as the drive source; an EV-state annunciator configured to notify a driver about the EV state, and a switching controller configured to control switching between notification and non-notification about the EV state. The switching controller is configured to bring the EV-state annunciator to a non-notification state when the EV-state determination unit determines that the mode is not the EV state and the engine rotational speed is greater than a predetermined first threshold value.

4 Claims, 4 Drawing Sheets

(51) Int. Cl.
*B60K 6/48* (2007.10)
*B60K 6/543* (2007.10)
*B60W 10/02* (2006.01)
*B60W 10/06* (2006.01)
*B60W 10/08* (2006.01)
*B60W 50/14* (2012.01)

(52) U.S. Cl.
CPC ............ *B60W 10/06* (2013.01); *B60W 10/08* (2013.01); *B60W 50/14* (2013.01); *B60K 2006/4825* (2013.01); *B60W 2050/146* (2013.01); *B60W 2510/0638* (2013.01); *Y02T 10/6221* (2013.01); *Y02T 10/6252* (2013.01); *Y02T 10/6286* (2013.01); *Y10S 903/914* (2013.01); *Y10S 903/918* (2013.01)

HYBRID VEHICLE CONTROL DEVICE AND CONTROL METHOD

BACKGROUND

Technical Field

The present invention relates to a hybrid vehicle that uses a combination of an engine and a motor for traveling as vehicle drive sources, and specifically to control for switching between notification and non-notification about an EV state in which only the traveling motor is used as a drive source.

Related Art

In a hybrid vehicle that uses a combination of an engine and a traveling motor, in order to notify the driver about an energy-saving EV state in which only the traveling motor is used as a drive source, as is generally known, an EV display for displaying the EV state is installed on an instrument panel, for example.

For instance, Patent document 1 has described a technology in which it is determined that an engine is in a non-operating state when engine rotational speed has fallen below a predetermined threshold value, and thus an EV state (an electric-only mode) is displayed by means of an EV display.

CITATION LIST

Patent Literature

Patent document 1: Japanese Patent Provisional Publication No. JP2005-255158

SUMMARY

However, in the case of switching of the EV display, based on only the engine rotational speed, between display and non-display, suppose that the predetermined engine-speed threshold value is set as an adequately low value. In the presence of a transition from a non-EV state (an engine operating state) to an EV state (an engine non-operating state), when a transition to the EV state has already been completed but the engine is still rotating due to inertial rotation, the engine rotational speed does not readily fall below the threshold value. In this case, switching of the EV display from non-display to display tends to delay. Conversely, suppose that the engine-speed threshold value is set as a high value. In the presence of a transition from an EV state to a non-EV state, when the engine has already started but the engine rotational speed does not yet exceed the threshold value, switching of the EV display to non-display tends to delay.

On the other hand, such a hybrid vehicle generally uses a plurality of traveling modes such as a hybrid state in which a traveling motor, together with an engine, is used, in addition to the previously-discussed EV state in which only the traveling motor is used as a drive source, while switching among the plurality of traveling modes. Therefore, switching of the EV display, based on a signal indicating that the traveling mode is the EV state, between display and non-display can be taken into account.

However, suppose that switching of the EV display between display and non-display is performed based on only the result of decision of the EV state. When changing from a non-EV state to an EV state, for instance, in a situation where the engine has to be rotated for a while for the purpose of exhaust gas purification even after having been changed to the EV state, suppose that engine rotational speed is still high and thus engine sound remains. In such a situation, assuming that the EV state is displayed, there is a possibility that uncomfortable feeling (the operating engine but the EV state displayed, that is, a contradicting impression between them) is given to the driver.

In contrast, when changing from an EV state to a non-EV state, the engine starts based on the result of decision of the non-EV state, and thus switching of the EV display from display to non-display occurs prior to the start of the engine (or immediately after the start of the engine). As a result, a display period of the EV display to be displayed for appealing or notifying to the driver about energy-saving becomes shortened unduly.

One or more embodiments of the present invention performs switching between notification and non-notification about an EV state.

According to one or more embodiments of the present invention, in a hybrid vehicle that uses a combination of an engine and a traveling motor as vehicle drive sources, a control device has an engine speed detector for detecting an engine rotational speed and an EV-state annunciator for notification about an EV state in which only the traveling motor is used as the drive source.

Furthermore, the control device is configured to determine whether a mode is the EV state in which only the traveling motor is used as the drive source. The control device is further configured to bring the EV-state annunciator to a non-notification state when it is determined that the mode is not the EV state and the engine rotational speed is greater than a predetermined first threshold value. The control device is still further configured to bring the EV-state annunciator to a notification state when it is determined that the mode is the EV state and the engine rotational speed is less than or equal to a predetermined second threshold value.

According to one or more embodiments of the invention, it is possible to more appropriately perform switching between notification and non-notification about an EV state, using engine speed and the result of decision of the EV state in combination.

DETAILED DESCRIPTION

Embodiments of the present invention are hereinafter described in detail with reference to the drawings. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

Figure 1:
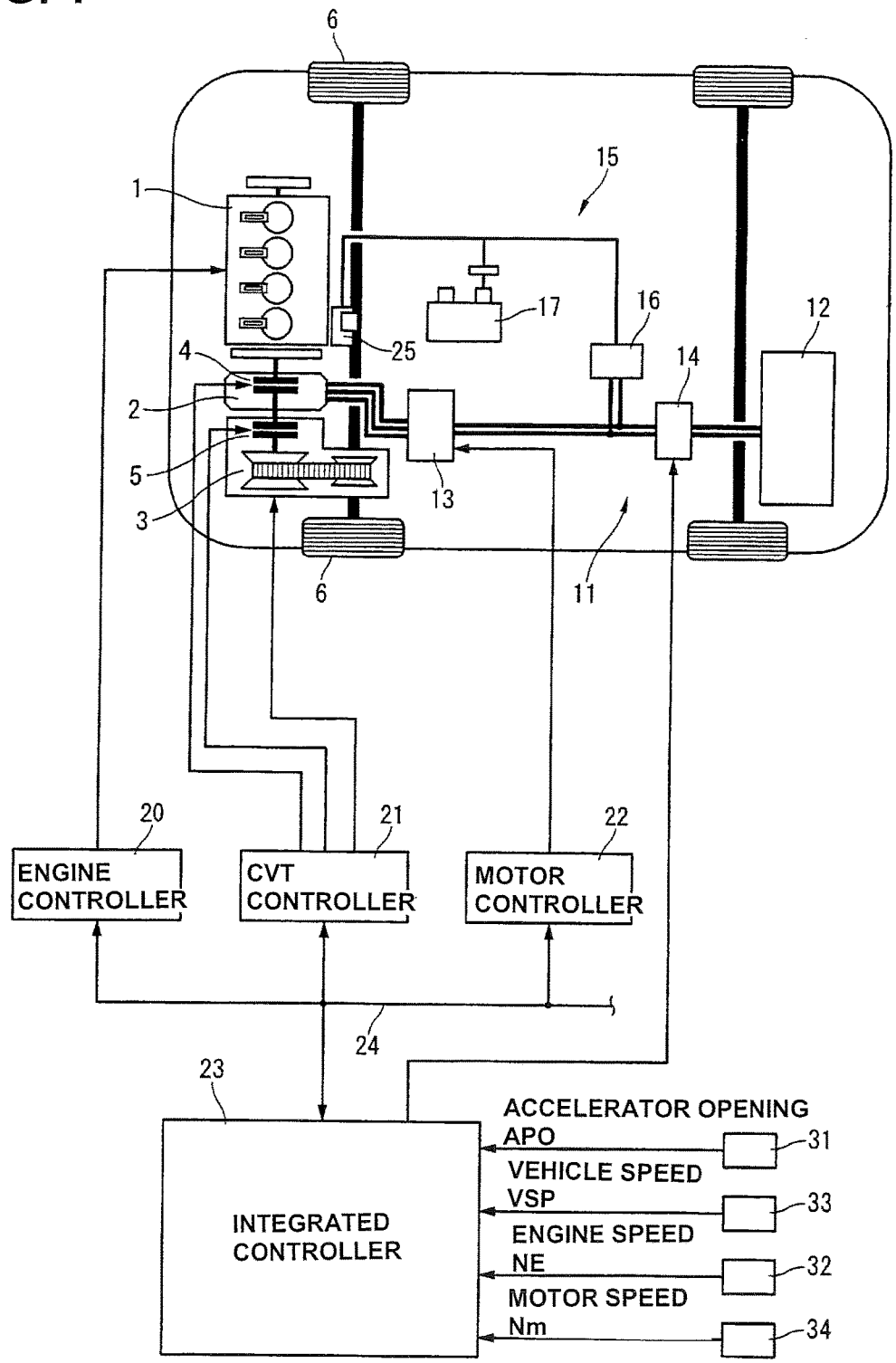
FIG. 1 is a system configuration explanatory drawing illustrating the system configuration of a hybrid vehicle according to one or more embodiments of the present invention

FIG. 1 is the system configuration explanatory diagram illustrating the system configuration of an FF (front-engine front-drive) hybrid vehicle, which is one example of a hybrid vehicle according to one or more embodiments of the present invention.

The hybrid vehicle is equipped with both an engine 1 and a motor generator 2 serving as a traveling motor, as vehicle drive sources. The hybrid vehicle is equipped with a belt-type continuously variable transmission 3 as a speed change mechanism. A first clutch 4 is interposed in a power-transmission path of engine 1 and motor generator 2, for switching between a connection state permitting power transmission and an open state cutting off power transmission. A second clutch 5 is interposed in a power-transmission path of motor generator 2 and belt-type continuously variable transmission 3, for switching between a connection state permitting power transmission and an open state cutting off power transmission.

Engine 1 is constructed by a gasoline engine, for example. Responsively to respective control commands from an engine controller 20, start control, stop control, throttle-valve opening control, and fuel-cut control and the like are executed.

The first clutch 4, which is interposed between the output shaft of engine 1 and the rotor of motor generator 2, is configured to connect the engine 1 to the motor generator 2 or disconnect the engine 1 from the motor generator 2, depending on the selected traveling mode. Engagement/release of the first clutch is controlled by a first clutch hydraulic pressure generated, based on a control command from a CVT controller 21, by means of a hydraulic unit (not shown). In according to one or more embodiments of the present invention, the first clutch 4 is constructed as a normally-open type.

Motor generator 2 is constructed by a three-phase alternating current synchronous motor generator, for example. The motor generator is connected to a strong power circuit 11 including a high-voltage battery 12, an inverter 13, and a strong power system relay 14. Motor generator 2 is configured to perform motor operation (so-called power-running) for outputting positive torque by electric power supply from the high-voltage battery 12 through the inverter 13 based on a control command from a motor controller 22 and perform regenerative operation for generating electricity by absorbing torque and for charging the high-voltage battery 12.

The second clutch 5, which is interposed between the rotor of motor generator 2 and the input shaft of continuously variable transmission 3, is configured to permit transmission of power between the vehicle drive sources including engine 1 and motor generator 2 and drive road wheels 6 (front road wheels) and cut off the power transmission. Engagement/release of the second clutch is controlled by a second clutch hydraulic pressure generated, based on a control command from the CVT controller 21, by means of the hydraulic unit (not shown). In particular, the second clutch 5 is configured to be operable in a slip-engagement state in which power transmission is performed with a slip by variable control of a transmitted torque capacity. Even with non-torque-converter equipped configuration, this enables smooth start, and also realizes creep traveling.

By the way, actually, the second clutch 5 is not constructed as a single friction element. The forward clutch or the reverse brake of a forward/reverse changeover mechanism, which is provided on the input side of continuously variable transmission 3, is used as the second clutch 5. Although it is not clearly shown, the forward/reverse changeover mechanism, which is configured to switch the direction of input rotation of continuously variable transmission 3 between a normal-rotational direction for forward-traveling and a reverse-rotational direction for backward-traveling, includes a planetary gear mechanism, the forward clutch, which is engaged during forward traveling, and the reverse clutch, which is engaged during backward traveling. During the forward traveling, the forward clutch functions as the second clutch 5. Conversely during the backward traveling, the reverse brake functions as the second clutch 5. In a specific state where the forward clutch and the reverse brake, each of which is able to serve as the second clutch 5, are both released, torque transmission is not performed. Hence, actually, the rotor of motor generator 2 and the continuously variable transmission 3 are disengaged from each other. According to one or more embodiments of the present invention, both of the forward clutch and the reverse brake are constructed as a normally-open type.

Belt-type continuously variable transmission 3 has an input-side primary pulley, an output-side secondary pulley, and a metal belt wound on the pulleys. The belt-contact radius of each of the pulleys, that is, the transmission ratio can be continuously controlled by a primary hydraulic pressure and a secondary hydraulic pressure generated, based on respective control commands from the CVT controller 21, by means of the hydraulic unit (not shown). The output shaft of continuously variable transmission 3 is connected through a final reduction gear (not shown) to the drive road wheels 6.

Engine 1 is equipped with a starter motor 25 for starting. Starter motor 25 is comprised of a direct-current motor whose rated voltage is lower than that of motor generator 2. The starter motor is connected to a weak power circuit 15 including a DC/DC converter 16 and a low-voltage battery 17. Starter motor 25 is driven based on a control command from the engine controller 20 for cranking the engine 1.

Low-voltage battery 17 is charged through the DC/DC converter 16 by electric power from the strong power circuit 11 including the high-voltage battery 12. By the way, a vehicle control system including the engine controller 20, a vehicle air conditioner, an audio apparatus, an illumination apparatus and the like receive electric power supply from the weak power circuit 15.

The control system of the hybrid vehicle is further equipped with an integrated controller 23 for integrated control of the entire vehicle, in addition to the engine controller 20, the CVT controller 21, and the motor controller 22. These controllers 20, 21, 22, and 23 are connected to each other via a CAN (controller area network) communication line 24 so as to permit mutual exchange of information among them. The control system is also equipped with various sensors, such as an accelerator opening sensor 31, an engine speed sensor 32 serving as an engine rotational speed detector (engine rotational speed detection means) for detecting an engine rotational speed, a vehicle speed sensor 33, a motor speed sensor 34 and the like. signals detected by these sensors are inputted to the integrated controller 23 and also inputted to the respective controllers via the CAN communication line 24.

The hybrid vehicle configured as discussed previously has a variety of traveling modes, that is, an electric vehicle traveling mode (hereinafter referred to as "EV mode"), a hybrid traveling mode (hereinafter referred to as "HEV mode"), a driving-torque control traveling mode (hereinafter referred to as "WSC" mode) and the like. An optimum traveling mode is selected depending on the vehicle operating condition and the accelerator operation by the driver.

The "EV mode" is a mode in which the first clutch 4 is kept in a release state, and the vehicle is traveling, using only the motor generator 2 as a drive source. The "EV mode" has a motor traveling mode and a regenerative traveling mode. The "EV mode" is selected when the driving force required by the driver is comparatively small.

The "HEV mode" is a mode in which the first clutch 4 is kept in an engagement state, and the vehicle is traveling, using both the engine 1 and the motor generator 2 as a drive source. The "HEV mode" has a motor-assist traveling mode, a power-generation traveling mode, and an engine traveling mode. The "HEV mode" is selected when the driving force required by the driver is comparatively large, and/or in the presence of a request from the system, based on a state of charge (SOC) of the high-voltage battery 12, the vehicle operating condition and the like.

The "WSC mode" is a mode selected in a comparatively low vehicle speed range, such as during vehicle starting. In the "WSC mode", the second clutch 5 is brought to a slip-engagement state by variably controlling the transmitted torque capacity of the second clutch 5 while executing rotational speed control of motor generator 2.

Figure 2:
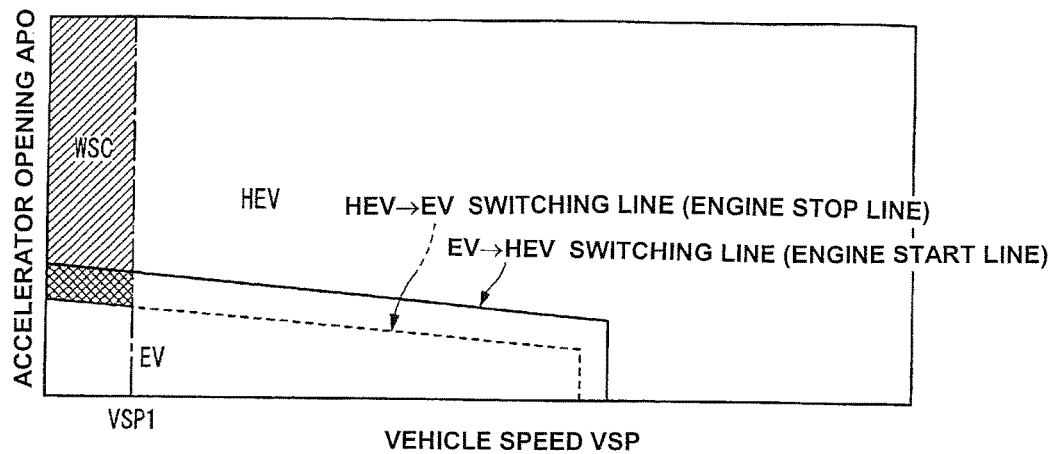
FIG. 2 is a characteristic diagram illustrating mode-switching of the hybrid vehicle.

FIG. 2 shows the basic characteristic of switching among the "EV mode", the "HEV mode", and the "WSC mode", based on the vehicle speed VSP and the accelerator opening APO. As seen from the characteristic diagram, the switching characteristic is set to have an appropriate hysteresis between an "HEV→EV switching line" for a transition from the "HEV mode" to the "EV mode" and an "EV→HEV switching line" for a transition from the "EV mode" to the "HEV mode". Also, in a speed range lower than or equal to a predetermined vehicle speed VSP1, the traveling mode becomes shifted to "the WSC mode".

Figure 3:
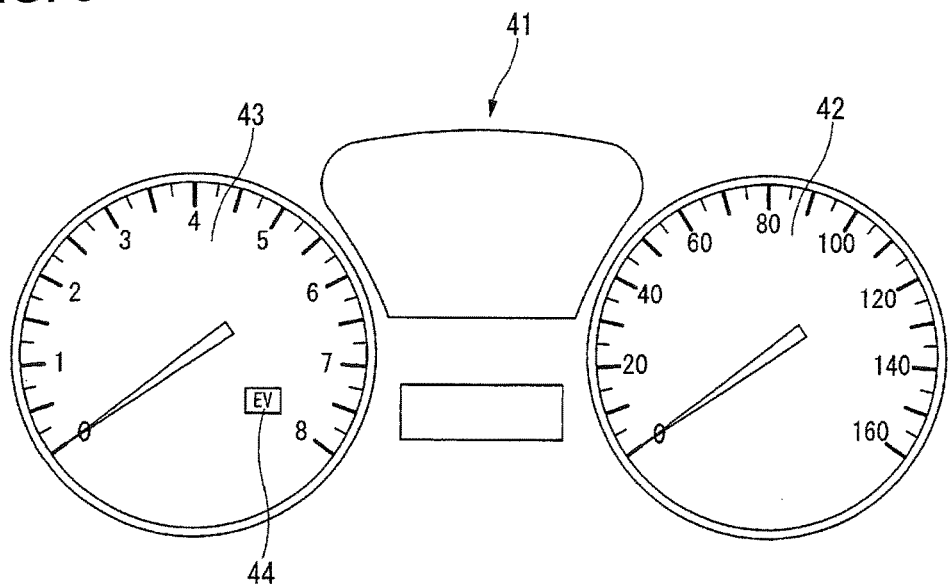
FIG. 3 is a front elevation view schematically illustrating the instrument panel of the hybrid vehicle.

FIG. 3 schematically shows an instrument panel 41 located on the dash board of the front of of front seats of the vehicle. As seen from the front elevation view, a variety of instruments, such as a speed meter 42 for indicating a vehicle speed, a tachometer 43 for indicating an engine rotational speed, a fuel level gauge (not shown), direction indicators (not shown) and the like are installed on the instrument panel 41. According to one or more embodiments of the present invention, an EV lamp 44 is located within the tachometer 43 of instrument panel 41. The EV lamp serves as an EV-state annunciator (EV-state notification means) that displays the "EV mode (EV state)" in which only the motor generator 2 is used as a vehicle drive source. For instance, EV lamp 44 is configured to light on or light off a character "EV" itself. In the EV mode, the EV lamp is displayed and turned ON. In contrast, in the non-EV mode such as the HEV mode, the EV lamp is not displayed and turned OFF.

By the way, the EV-state annunciator is not limited to the previously-discussed EV lamp 44. For instance, another type of EV-state annunciator that displays a pattern or a figure, corresponding to the EV mode, may be used. In lieu thereof, another type of EV-state annunciator that informs or notifies the driver about the EV mode in the form of a voice (an audible tone) may be used.

Figure 4:
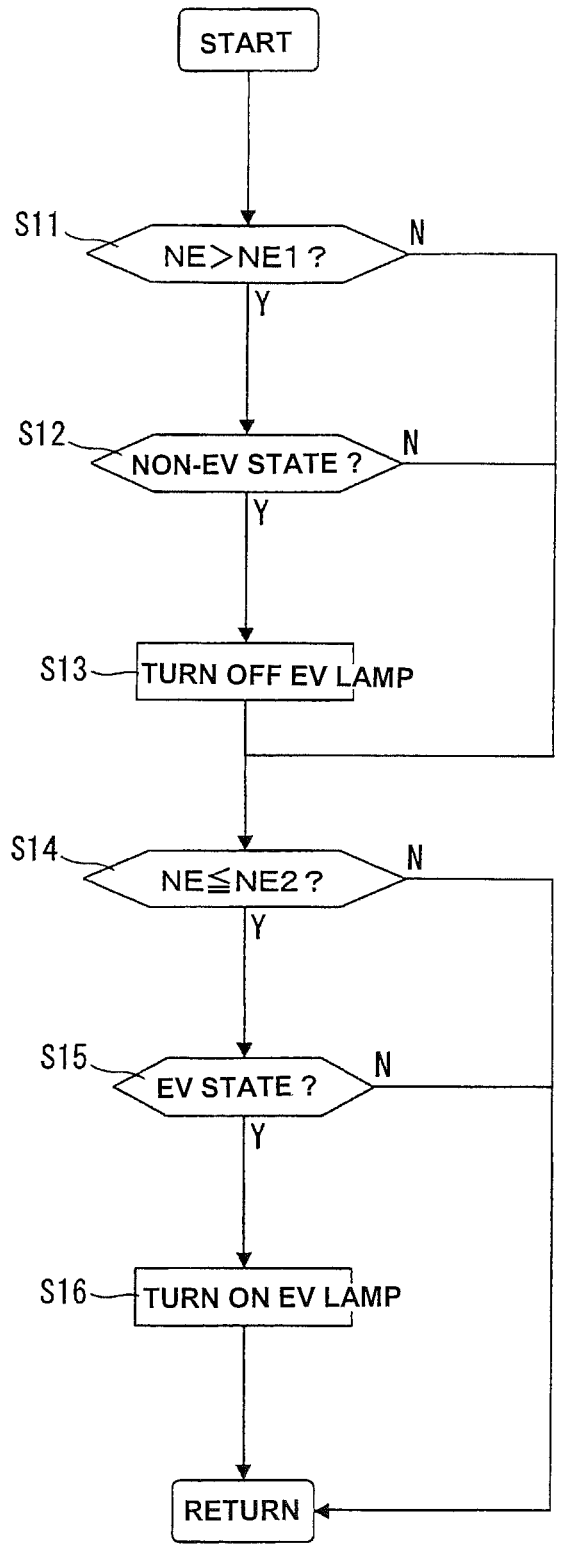
FIG. 4 is a flowchart illustrating the flow of switching control for an EV lamp between turn-on and turn-off in one or more embodiments of the present invention.

FIG. 4 is the flowchart illustrating the flow of switching control for EV lamp 44 between turn-on and turn-off. This routine is stored in the previously-discussed integrated controller 23, and repeatedly executed every predetermined time intervals such as 10 milliseconds.

At step S11, a check is made to determine whether engine rotational speed NE is higher than a predetermined first threshold value NE1. The first threshold value NE1 is set to a speed value near an initial explosion speed at which ignition starts during engine starting. Concretely, the first threshold value is set to a speed value less than or equal to 300 rpm (revolution per minutes). More concretely, the first threshold value is set to approximately 150 rpm.

Figure 5:
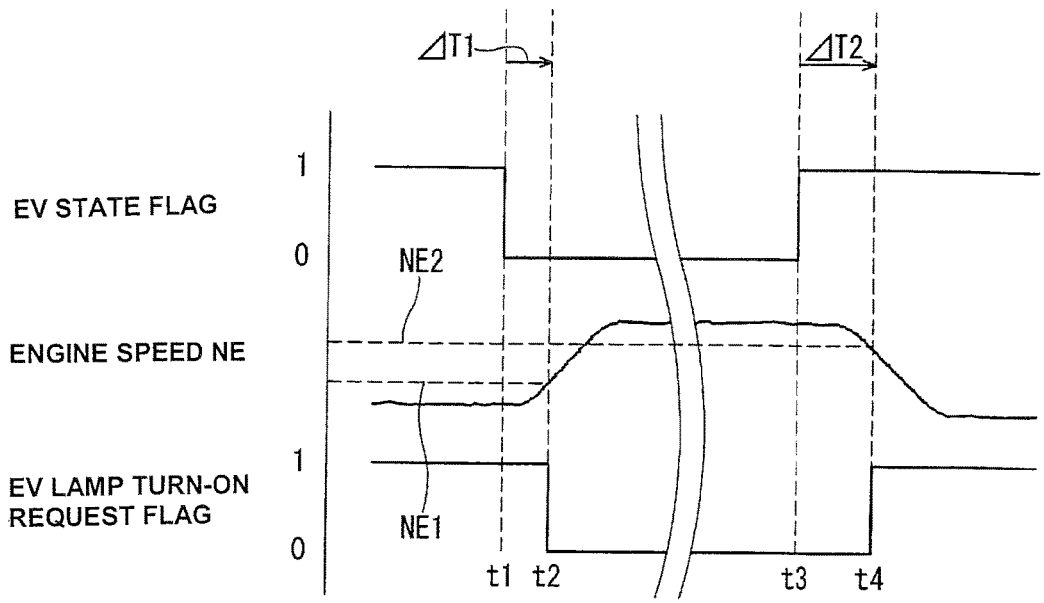
FIG. 5 is a timing chart illustrating one example of operation according to one or more embodiments of the present invention.
Figure 6:
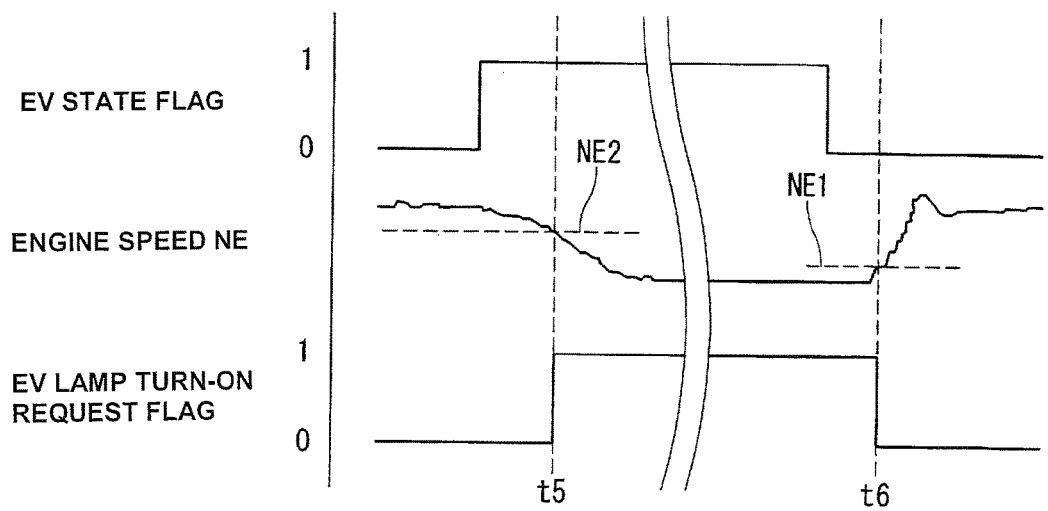
FIG. 6 is a timing chart illustrating another example of operation according to one or more embodiments of the present invention.

At step S12, a check is made to determine whether a mode is a non-EV state. The check (the decision) is determined based on the value of an EV state flag. As shown in FIGS. 5 and 6, the EV state flag is set to "1" when the mode is an EV state, and also reset to "0" when the mode is a non-EV state. The EV state flag is determined or set depending on the vehicle operating condition, for instance the accelerator opening and the battery state of charge (SOC) and the like. As described later, depending on the setting state (setting/resetting) of the EV state flag, switching of the first clutch 4 as well as switching of EV lamp 44 between turn-on and turn-off is performed. That is, responsively to the EV state flag serving as a command, switching control of both the first clutch 4 and the EV lamp 44 is performed. Therefore, when the EV state flag is "0", it is determined that the mode is the non-EV state and thus the answer to step S12 becomes affirmative (YES).

When engine rotational speed NE exceeds the first threshold value NE1 and the mode is the non-EV state, the routine proceeds to step S13. At this step, EV lamp 44 is turned OFF. That is, the EV lamp is not displayed.

At step S14, a check is made to determine whether engine rotational speed NE is less than or equal to a predetermined second threshold value NE2. The second threshold value NE2 is set to a speed value greater than at least the first threshold value. Additionally, the second threshold value is set to a low rotational speed that permits self-sustained operation of the engine, that is, a speed value lower than an idle speed. Concretely, the second threshold value is set to a value within a range of approximately 600-700 rpm.

At step S15, a check is made to determine whether the mode is an EV state. In a similar manner to step S12, the check (the decision) of this step is determined based on the value of the EV state flag. When the EV state flag is "1", it is determined that the mode is the EV state and thus the answer to step S15 becomes affirmative (YES).

When engine rotational speed NE is less than or equal to the second threshold value NE2 and the mode is the EV state, the routine proceeds to step S16. At this step, EV lamp 44 is turned ON and displayed.

FIGS. 5 and 6 show the timing charts obtained when applying the previously-discussed switching control according to one or more embodiments of the present invention. In these time charts, the EV state flag is a flag which is set to "1" in an EV state, and also reset to "0" in a non-EV state. On the other hand, an EV lamp turn-on request flag is a flag which is set to "1" when turning the EV lamp 44 ON, and also reset to "0" when turning the EV lamp 44 OFF. Responsively to the value of the EV lamp turn-on request flag, switching control of EV lamp 44 between turn-on and turn-off is performed by means of the integrated controller 23.

FIG. 5 shows the timing chart in the presence of a transition from an EV state through a non-EV state to an EV state. Assuming that EV lamp 44 becomes turned OFF at the time t1 when the EV state flag becomes reset to "0", the first clutch 4 becomes engaged in response to the result of decision of the EV state flag and then the engine 1 starts. Therefore, EV lamp 44 is turned OFF prior to the start of the engine. Thus, the lighting time of EV lamp 44 tends to become shortened unduly. In contrast to the above, according to one or more embodiments of the present invention, at the time t2 when the EV state flag has been reset to "0" (that is, in a non-EV state) and engine rotational speed NE exceeds the first threshold value NE1, the EV lamp turn-on request flag becomes reset to "0" and then EV lamp 44 becomes turned OFF. In this manner, EV lamp 44 becomes turned OFF, after engine rotational speed NE has risen to a certain extent. Hence, it is possible to lengthen the lighting time of EV lamp 44 by a time length ΔT1, as compared with a comparative example such that EV lamp 44 becomes turned OFF immediately after the time t1 when a transition to the non-EV state has occurred. Additionally, by virtue of setting of the first threshold value NE1 to an adequately low value, EV lamp 44 can be turned OFF in concert with a rise in engine rotational speed displayed on the tachometer 43. Therefore, there is a less tendency for uncomfortable feeling to be imparted to the driver, while assuring the lighting time of EV lamp 44 as long as possible.

Also, assuming that EV lamp 44 becomes turned ON at the time t3 when the EV state flag has been set again to "1", turning the EV lamp 44 ON under a state where engine rotational speed NE is still high and thus engine sound is generated may impart uncomfortable feeling to the driver. In contrast to the above, according to one or more embodiments of the present invention, at the time t4 when the EV state flag has been set to "1" and engine rotational speed NE becomes less than or equal to the second threshold value NE2, the EV lamp turn-on request flag becomes set to "1" and then EV lamp 44 becomes turned ON. That is, EV lamp 44 becomes turned ON, after, even in the EV state, engine rotational speed NE has fallen to a certain extent (see a time length ΔT2). Hence, there is a less tendency for the EV lamp 44 to be turned ON under a state where engine sound is sufficiently perceived audibly, and thus there is no risk that uncomfortable feeling is given to the driver.

FIG. 6 shows the timing chart in the presence of a transition from a non-EV state through an EV state to a non-EV state. In a similar manner to FIG. 5, at the time t5 when the EV state flag has been set to "1" and engine rotational speed NE becomes less than or equal to the second threshold value NE2, the EV lamp turn-on request flag becomes set to "1" and then EV lamp 44 becomes turned ON. Thereafter, at the time t6 when the EV state flag has been reset to "0" and engine rotational speed NE exceeds the first threshold value NE1, the EV lamp turn-on request flag becomes reset to "0" and then EV lamp 44 becomes turned OFF.

As set out above, one or more embodiments of the present invention uses the flag related to the EV state and the engine rotational speed in combination. In particular, the device according to one or more embodiments of the present invention is configured such that EV lamp 44 becomes turned OFF when in a non-EV state and engine rotational speed NE is higher than the first threshold value NE1, and that EV lamp 44 becomes turned ON when in an EV state and engine rotational speed NE is less than or equal to the second threshold value NE2. Hence, it is possible to duly (exactly) assure the lighting time of EV lamp 44 without imparting uncomfortable feeling to the driver, thus enabling more appropriate switching of EV lamp 44 between turn-on and turn-off.

The time when EV lamp 44 becomes switched from turn-on to turn-off corresponds to a specific situation where the engine starts up and thus engine rotational speed NE is readily rising. Therefore, the first threshold value NE1, used for switching of EV lamp 44 from turn-on to turn-off, is set to a lowest possible speed value (approximately 150 rpm) suited to the stage of initial explosion and ignition start during the initial part of engine starting. Therefore, it is possible to more duly turn the EV lamp 44 OFF in concert with a rise in engine rotational speed. In contrast, the time when EV lamp 44 becomes switched from turn-off to turn-on corresponds to a specific situation where the engine stops and thus engine rotational speed NE is reducing. Therefore, the second threshold value NE2, used for switching of EV lamp 44 from turn-off to turn-on, is set to a speed value (approximately 700 rpm) relatively greater than the first threshold value NE1 used for turn-off.

By the way, in the case of switching of EV lamp 44, based on only the engine rotational speed NE, between turn-on and turn-off, it is difficult to set the first threshold value NE1 used for turn-off smaller than the second threshold value NE2 used for turn-on. Concretely, when engine rotational speed NE exists between the first threshold value NE1 and the second threshold value NE2, a contradiction in logic decision occurs due to these two threshold values, and thus it is impossible to determine whether turn-on operation or turn-off operation should be made. That is, the previously-discussed settings of the threshold values (i.e., NE1<NE2) can be realized in combination with the decision of the EV state as set forth in regard to the switching control according to one or more embodiments of the present invention previously described.

Also, according to one or more embodiments of the present invention, the EV state flag for determining an EV state is a flag generated based on a command value concerning engagement/release of the first clutch 4. That is, the value of the EV state flag for determining an EV state is identical to information on whether the first clutch 4 is engaged or released. The EV state flag for determining an EV state is utilized in determining if EV lamp 44 should be turned ON or turned OFF. When the EV state flag is set to "1", the first clutch is in its release state. Hence, it is, in principle, impossible that an increase in engine rotational speed occurs for reasons other than operation (combustion) of the engine itself. Therefore, it is possible to determine that EV lamp 44 should be turned ON, at the time when the engine rotational speed has fallen to a low rotational speed that permits self-sustained operation of the engine, that is, a speed value lower than an idle speed. Conversely when the EV state flag is reset to "0", the first clutch is in its engagement state, and thereafter rotation of the engine tends to continue. Therefore, it is possible to determine that EV lamp 44 should be turned OFF at a speed value near an initial explosion speed at which ignition starts. As set forth above, by identifying the EV state flag for determining an EV state with information on whether the first clutch 4 is engaged or released, it is possible to realize a more accurate decision concerning turn-on/turn-off of EV lamp 44.

Furthermore, according to one or more embodiments of the present invention, the EV state flag for determining an EV state is generated based on a command value used for engagement/release control of the first clutch 4. It is possible to perform switching of EV lamp 44 between turn-on and turn-off with a more favorable responsiveness, as compared with a comparative example such that an EV state is determined based on the actual result of switching of the first clutch 4. Additionally, the use of the EV state flag eliminates the necessity having a variety of sensors for detecting operation of the first clutch 4. This achieves more simplified control.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:

1. A control apparatus of a hybrid vehicle that uses a combination of an engine and a traveling motor as vehicle drive sources, comprising:
   an engine speed detector configured to detect an engine rotational speed;
   an EV-state determination unit configured to determine whether a mode is an EV state in which only the traveling motor is used as the drive source;
   an EV-state annunciator configured to notify a driver about the EV state; and
   a switching controller configured to control switching between notification and non-notification about the EV state,
   wherein the switching controller comprises:
      a first switching control section configured to bring the EV-state annunciator to a non-notification state when the EV-state determination unit determines that the mode is not the EV state and the engine rotational speed is greater than a predetermined first threshold value, and
      a second switching control section configured to bring the EV-state annunciator to a notification state when the EV-state determination unit determines that the mode is the EV state and the engine rotational speed is less than or equal to a predetermined second threshold value greater than the first threshold value.

2. The control apparatus of the hybrid vehicle as recited in claim 1, further comprising:
   a first clutch interposed in a power-transmission path between the engine and the traveling motor, configured to switch between a connection state permitting power transmission between the engine and the traveling motor and an open state cutting off the power transmission between the engine and the traveling motor; and
   a second clutch interposed in a power-transmission path between the traveling motor and drive road wheels, that is configured to switch between a connection state permitting power transmission between the traveling motor and the drive road wheels and an open state cutting off the power transmission between the traveling motor and the drive road wheels,
   wherein the traveling motor is interposed between the engine and the drive road wheels, and
   wherein, in the EV state, the first clutch is released.

3. The control apparatus of the hybrid vehicle as recited in claim 2,
   switching of an EV display between a display state and a non-display state is performed simultaneously with switching of the first clutch between an engagement state and a release state, based on a command value indicating a decision result of the EV-state determination unit.

4. A control method for a hybrid vehicle having a combination of an engine and a traveling motor as vehicle drive sources, and comprising an EV-state annunciator for notifying that a mode is an EV state in which only the traveling motor is used as the drive source, comprising:
   detecting an engine rotational speed;
   determining whether the mode is the EV state in which only the traveling motor is used as the drive source;
   executing a first switching control mode of bringing the EV-state annunciator to a non-notification state when a determination is made that the mode is not the EV state and the engine rotational speed is greater than a predetermined first threshold value; and
   executing a second switching control mode of bringing the EV-state annunciator to a notification state when a determination is made that the mode is the EV state and the engine rotational speed is less than or equal to a predetermined second threshold value greater than the first threshold value.

\* \* \* \* \*